United States Patent
Harada et al.

(10) Patent No.: US 7,295,779 B2
(45) Date of Patent: Nov. 13, 2007

(54) WAVELENGTH DIVISION-MULTIPLEXING OPTICAL TRANSMISSION SYSTEM

(75) Inventors: Shigekazu Harada, Tokyo (JP); Akio Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 789 days.

(21) Appl. No.: 10/265,392

(22) Filed: Oct. 7, 2002

(65) Prior Publication Data

US 2003/0067652 A1   Apr. 10, 2003

(30) Foreign Application Priority Data

Oct. 5, 2001  (JP)  .............................. 2001-309873

(51) Int. Cl.
*H04J 14/02* (2006.01)
*H04J 14/00* (2006.01)
(52) U.S. Cl. .............................. 398/79; 398/43; 398/82
(58) Field of Classification Search ............ 398/41–99; 359/618
See application file for complete search history.

(56) References Cited

U.S. PATENT DOCUMENTS

| 6,295,148 B1 * | 9/2001 | Atlas ............................... 398/9 |
| 6,785,472 B1 * | 8/2004 | Adams et al. ................ 398/79 |
| 2002/0030866 A1 * | 3/2002 | Wu et al. .................... 359/122 |
| 2002/0150329 A1 * | 10/2002 | Ahn et al. .................... 385/24 |
| 2002/0191250 A1 * | 12/2002 | Graves et al. .............. 359/128 |

FOREIGN PATENT DOCUMENTS

| JP | 2000-13361 | | 1/2000 |
| JP | 2000-244404 | * | 9/2000 |
| JP | 2001-36479 | | 2/2001 |
| JP | 2001-36557 | | 2/2001 |
| JP | 2001-249236 | | 9/2001 |

OTHER PUBLICATIONS

Takachio et al. (A study on a 10 Gb/s, 8 channel WDM transmission system employing unequal wavelength allocation, Technical research report of the institute of electronics, information and communication engineers, CS 96-43, pp. 19-24, Jun. 1996).*

\* cited by examiner

*Primary Examiner*—M. R. Sedighian
(74) *Attorney, Agent, or Firm*—Young & Thompson

(57) ABSTRACT

A wavelength division-multiplexing system is provided that uses wavelength grids in conformity with the ITU-T Recommendation G.692 and that is realizable at lower costs. In the system, the wavelengths of signal light beams transmitted from plural optical transmitters are respectively spaced apart in such a manner that multiplexed wavelengths are set at regular intervals within the band range of the optical amplifier 5. The wavelength range of each laser beam covers at least two grids including neighboring grids. The wavelength demultiplexer 3 on the receiving side has the passband passing the wavelengths in a laser wavelength range corresponding to each channel.

11 Claims, 7 Drawing Sheets

WAVELENGTH DIVISION-MULTIPLEXING OPTICAL TRANSMISSION SYSTEM

BACKGROUND OF THE INVENTION

The present invention relates to an optical transmission system using a wavelength division multiplexing technology.

In recent years, high-dense wavelength division-multiplexing systems have been realized with the advance of the laser wavelength control technique. In the ITU-T Recommendation G.692, it is standardized to arrange laser wavelengths at wavelength intervals of 100 GHz to 1000 GHz corresponding to multi-channels.

That laser wavelength control is usually controlled under temperature adjustment. However, in some passbands for wavelength division multiplexing, the temperature is adjusted with a precision of, e.g. +−0.5° C. or less. In some cases, predetermined stable wavelengths can be obtained using the wavelength locker.

The wavelength division-multiplexing transmission in which the wavelength interval is widened up to several THz has been proposed to eliminate the temperature control.

However, narrowing densely the wavelength interval requires adjusting the temperature of a laser with high precision. The laser current flows to control the optical output power, thus varying the wavelength. This results in more complicated control and in increased costs of the optical transmitters.

In the wavelength division-multiplexing system, the optical transmitters are arranged corresponding to the number of wavelengths to be multiplexed while the optical receivers are arranged corresponding to the number of wavelengths to be multiplexed. Hence the problem is that the costs of each optical transmitter or each optical receiver must be reduced to decrease the costs of the entire system. This is particularly important to applications that require inexpensive systems even in low multiplicity.

When the wavelength interval is widened up to, for example, 2.5 THz (20 nm), some systems can neglect the laser temperature adjustment. However, to multiplex, for example, four waves, a wide range of about 60 nm is required so that the lasers must be arranged over a wide range.

Moreover, there is the problem in that because the wavelength interval exceeds the band of the C band (1530 nm to 1560 nm) Erbium-doped fiber amplifier (EDFA), the loss margin cannot be ensured in some cases.

With no temperature control, it is difficult to use an external modulator integrated laser beam source, in consideration of the temperature characteristics of the modulator. It is required to modulate directly a semiconductor laser with good temperature characteristics. Consequently, the chirping in the laser direct modulation of the semiconductor laser becomes larger, compared with the use of the external modulator, so that the transmission distance is limited.

SUMMARY OF THE INVENTION

The present invention is made to solve the above-mentioned problems. An object of the present invention is to provide a wavelength division-multiplexing system that uses wavelength grids in conformity with the ITU-T Recommendation G.692 and that is realizable at lower costs.

According to an aspect of the present invention, a wavelength division-multiplexing optical transmission system comprises a plurality of optical transmitters for producing optical signals respectively, a wavelength on each of wavelength grids being defined as a center wavelength of each optical signal, the wavelength grids on which laser wavelengths are allocated at intervals of 100 GHz, the wavelength interval between respective channels being spaced apart at least two grids, the band of each channel covering at least two grids including neighboring grids; a wavelength multiplexer for receiving optical signals output from the plurality of optical transmitters, multiplexing wavelengths of the optical signals, and then outputting multiplexed optical signals; a wavelength demultiplexer for receiving optical signals transmitted output from the wavelength multiplexer, demultiplexing wavelengths of the optical signals, and then outputting optical signals having different wavelengths; and a plurality of optical receivers for converting optical signals, each with a predetermined wavelength range, output from the wavelength demultiplexer, into electrical signals.

In the wavelength division-multiplexing optical system according to the present invention, the wavelength multiplexer has a passband in which optical signals pass within a laser wavelength range of a corresponding channel of an optical transmitter. The wavelength demultiplexer has a passband in which optical signals pass within a laser wavelength range of a corresponding channel of an optical transmitter.

In the wavelength division-multiplexing optical system according to the present invention, the wavelength multiplexer multiplexes wavelengths using a thin film interference filter. The wavelength demultiplexer demultiplexes wavelengths using a thin film interference filter.

According to another aspect of the present invention, a wavelength division-multiplexing optical transmission system comprises a plurality of optical transmitters for producing optical signals respectively, a wavelength on each of wavelength grids being defined as a center wavelength of each optical signal, the wavelength grids on which laser wavelengths are allocated at intervals of 100 GHz, the wavelength interval between respective channels being spaced apart at least two grids, the wavelengths multiplexed within an optical amplifier being set so as to arrange at regular intervals, the band of each channel covering at least two grids including neighboring grids; a wavelength multiplexer for multiplexing wavelengths of optical signals input from said plurality of optical transmitters and then outputting multiplexed optical signals; an optical amplifier connected to the wavelength multiplexer and to an optical fiber, for amplifying the optical signals input; a wavelength demultiplexer for demultiplexing wavelengths of optical signals output from the optical amplifier, and then outputting optical signals having different wavelengths; and a plurality of optical receivers for converting optical signals, each with a predetermined wavelength range, output from the wavelength demultiplexer, into electrical signals.

In the wavelength division-multiplexing optical transmission system, the optical amplifier comprises an Erbium-doped fiber amplifier (EDFA).

In the wavelength division-multiplexing optical transmission system according to the present invention, the wavelength multiplexer multiplexes wavelengths using a thin film interference filter. The wavelength demultiplexer demultiplexes wavelengths using a thin film interference filter.

As described above, the wavelength division-multiplexing optical transmission system according to the present invention employs the wavelength grid in conformity with the ITU-T Recommendation G.692 as a laser wavelength of the optical transmitter corresponding to each channel. Moreover, according to the present invention, the wavelength interval between channels is set to arrange multiplexed wavelengths at regular intervals within the band range of the optical amplifier. The wavelength range of each laser covers at least two grids including neighboring grids. Moreover, the wavelength demultiplexer on the receiving side has the passband passing the wavelengths in a laser wavelength range corresponding to each channel.

BRIEF DESCRIPTION OF THE DRAWINGS

This and other objects, features and advantages of the present invention will become more apparent from the following detailed description taken in conjunction with the attached drawings, in which.

DESCRIPTION OF THE EMBODIMENTS

Wavelength division-multiplexing optical transmission systems according to embodiments of the present invention will be described below by referring to the attached drawings.

Figure 1:
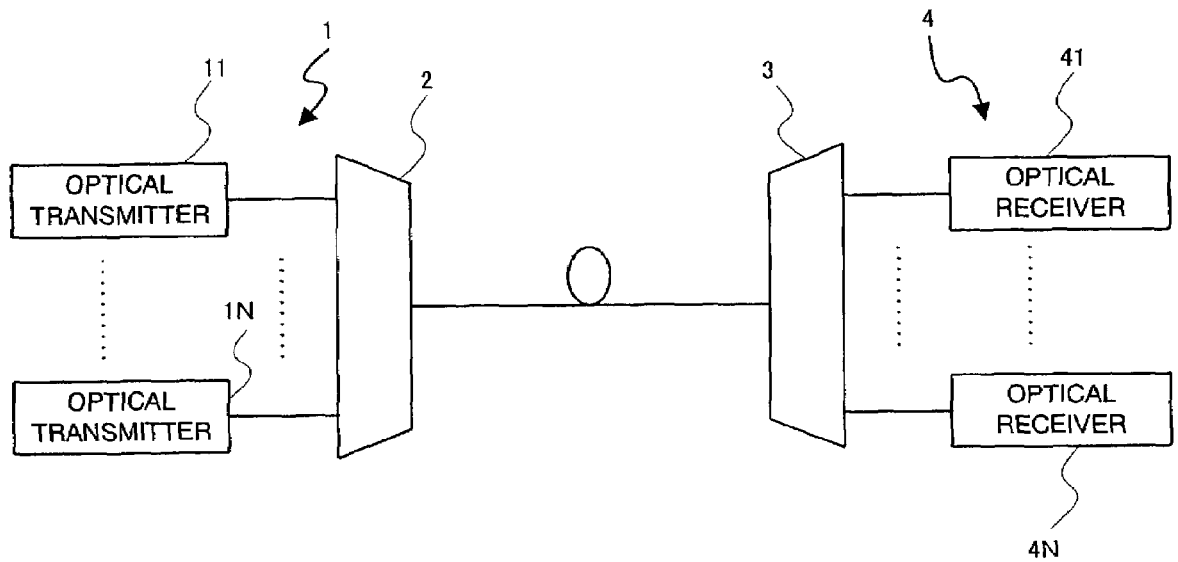
FIG. 1 is a block diagram illustrating a wavelength division-multiplexing system according to a first embodiment of the present invention.

In the first embodiment shown in FIG. 1, the wavelength division-multiplexing optical transmission system consists of a plurality of optical transmitters 1 (11, 12, 13, 14, . . . 1N), a wavelength multiplexer 2 connected to the optical transmitters 1, a wavelength demultiplexer 3 connected to the wavelength multiplexer 2 optically transmittable via an optical fiber, and optical receivers 4 (41, 42, 43, 44, . . . 4N) of the same number as that of the optical transmitters 1 connected to the wavelength demultiplexer 3.

Figure 2:
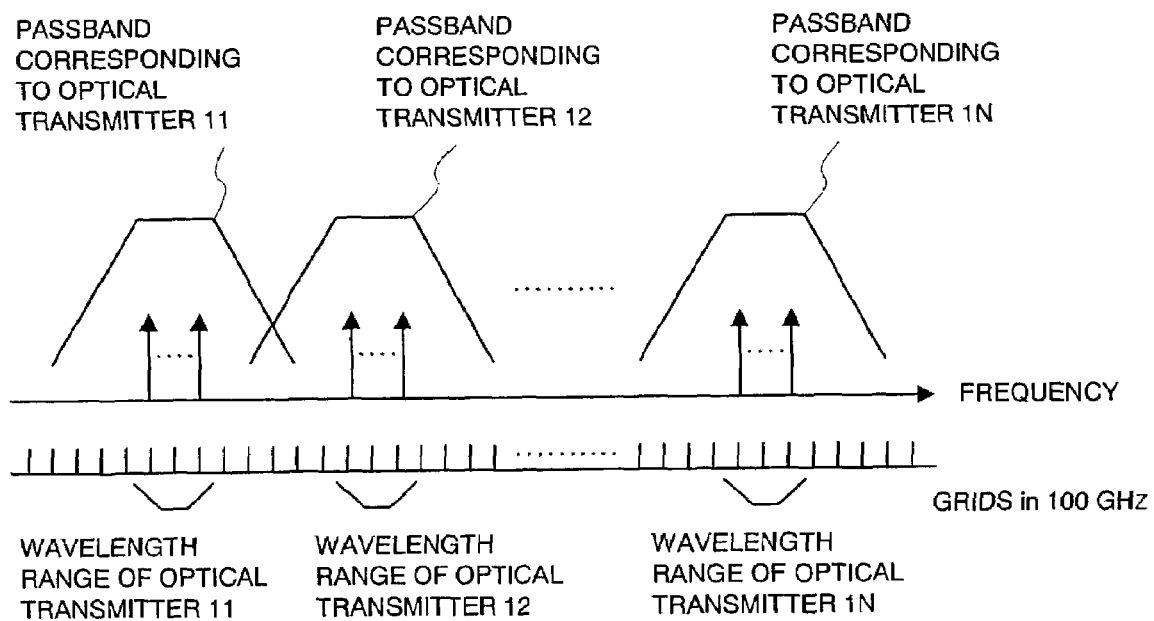
FIG. 2 is an explanatory diagram illustrating a relationship between transmission wavelengths and passbands in the first embodiment of the present invention.

The optical transmitters 1 each have the function of converting an electrical signal into an optical signal. The optical signals output from respective optical transmitters have respectively different wavelengths to avoid interference between wavelengths. The wavelengths, as shown in FIG. 2, are positioned on the wavelength grids according to the ITU-T Recommendations G.692 and cover at least two grids including neighboring grids.

The wavelength multiplexer 2 multiplexes the wavelengths of respective optical signals output from respective optical transmitters and then outputs the multiplexed optical signals.

The wavelength demultiplexer 3 demultiplexes the wavelengths of optical signals transmitted via the optical fiber and then outputs the demultiplexed optical signals to the optical receivers 4.

Each optical receiver 4 converts an optical signal of a predetermined wavelength into an electrical signal to restore an electrical signal input to the optical transmitter 1.

The passband of each channel in the wavelength multiplexer 2 or the wavelength demultiplexer 3 (the top of a characteristic in a trapezoid form of each channel in FIG. 2) passes the wavelength corresponding to the optical transmitters 1 (11, 12, 13, 14, . . . 1N).

In an operation of the wavelength division-multiplexing optical transmission system having the above configuration, the optical transmitters 1 (11, 12, 13, 14, . . . 1N) first transmit optical signals each having a predetermined different wavelength. The wavelength multiplexer 2 multiplexes the wavelengths of the optical signals and then outputs the multiplexed optical signals. The wavelength demultiplexer 3 receives the optical signals via the optical fiber and then demultiplexes them into original optical signals each having a predetermined different wavelength. The optical receivers 4 (41, 42, 43, 44, . . . 4N) convert the demultiplexed optical signals, each having a wavelength, into electrical signals.

Figure 3:
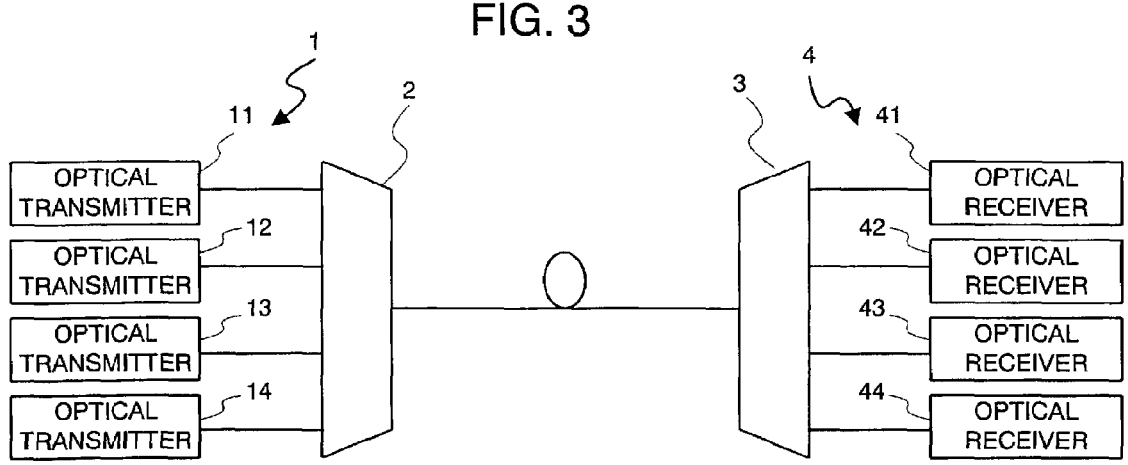
FIG. 3 is a block diagram illustrating a wavelength division-multiplexing system according to the first embodiment of the present invention.

The embodiment will be explained in more detail by referring to FIGS. 3 and 4.

Each of the optical transmitters 11, 12, 13 and 14 is an optical transmitter having an Electroabsorptive external modulator integrated semiconductor laser beam source. The optical transmitter 11 has its center wavelength of 1539.77 nm (194.70 THz). The optical transmitter 12 has its center wavelength of 1546.12 nm (193.90 THz). The optical transmitter 13 has its center wavelength of 1552.52 nm (193.10 THz). The optical transmitter 14 has its center wavelength of 1558.98 nm (192.30 THz). In plural optical transmitters 11, 12, 13 and 14, wavelengths are respectively positioned on the wavelength grid in which laser wavelengths are allocated at 100 GHz intervals, each acting as a center wavelength (shown with an arrow upward extending in FIG. 4). Respective optical transmitters output optical signals in such a way that the wavelength interval between channels is 8 grids (an interval of 800 GHz) and that each channel band has three grids including neighboring grids.

Each optical transmitter outputs an optical signal of an output power of +2 dBm at a transmission rate of 10 Gb/s.

The wavelength multiplexer 2 is formed of a thin film interference filter which has characteristics including a passband of 2.5 nm, a loss of 2 dB and an isolation of 15 dB. The thin film interference filter multiplexes wavelengths of optical signals input from each of the optical transmitters 11, 12, 13 and 14 and then outputs the multiplexed optical signals.

The wavelength multiplexer 2 transmits optical signals to the wavelength demultiplexer 3 over a distance of 20 km, with a single-mode fiber in conformity with the ITU-T Recommendation G.652 or G.655.

Likewise the wavelength multiplexer 2, the wavelength demultiplexer 3 is formed of a thin film interference filter having characteristics including a passband of 2.5 nm, a loss of 2.5 dB and an isolation of 25 dB. The wavelength demultiplexer 3 demultiplexes the wavelength of optical signals input via a transmission path (or an optical fiber) and then outputs the wavelengths of the demultiplexed optical signals.

Each of the optical receivers 41, 42, 43 and 44 is an optical receiver having a receiving sensitivity of −14 dBm. Each optical receiver receives an optical signal with a predetermined different wavelength from the wavelength demultiplexer 3 and then converts it into an electrical signal.

Figure 4:
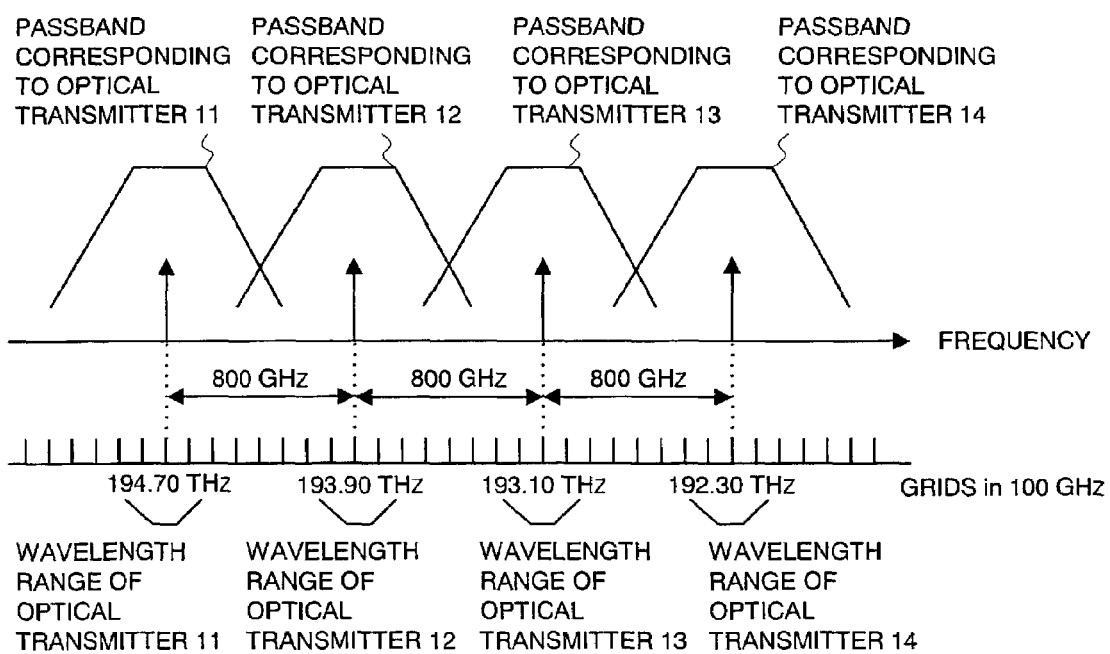
FIG. 4 is an explanatory diagram illustrating a relationship between transmission wavelengths and passbands in the first embodiment of the present invention.

FIG. 4 shows the relationship between transmission wavelengths in the wavelength division-multiplexing optical transmission system and passbands of the wavelength multiplexer 2 and of the wavelength demultiplexer 3.

In respective channels, the wavelengths are arranged at regular intervals of 800 GHz. Each passband has approximately a range of three grids, each being 100 GHz.

In this embodiment, the passband is 2.5 nm. The laser wavelength range is a center wavelength +−1.0 nm. In this case, the temperature adjustment range is approximately +−1° C.

In conventional requirement, the temperature adjustment is carried out with a precision of at least about +−0.5° C. or less at 100 GHz intervals. Hence, the present invention can vastly moderate the laser wavelength adjustment requirement, compared with the conventional requirement.

The number of wavelengths to be multiplexed is set to 4 but should not be limited only to that example. The number of wavelengths to be multiplexed may be arbitrarily set to 2, 3, or 5. In the example, wavelengths are set to 1539.77 nm (194.70 THz), 1546.12 nm (193.90 THz), 1552.52 nm (193.10 THz), and 1558.98 nm (192.30 THz). However, other grid wavelengths may be applied.

Figure 5:
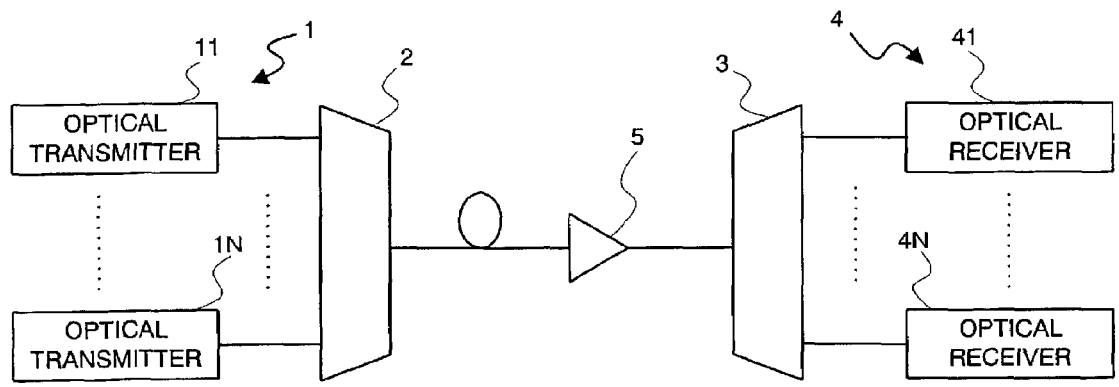
FIG. 5 is a block diagram illustrating a wavelength division-multiplexing system according to a second embodiment of the present invention.

The wavelength division-multiplexing optical transmission system in the second embodiment is shown in FIG. 5. An optical amplifier 5 is inserted between the wavelength multiplexer 2 and the wavelength demultiplexer 3 of the first embodiment. Like numerals are attached to the same elements as those in the first embodiment and hence the duplicate explanation will be omitted here.

The optical amplifier 5 amplifies optical signals multiplexed in the wavelength multiplexer 2 in a lump mode. The optical amplifier 5 amplifies optical signals transmitted via the optical fiber. The wavelength demultiplexer 3 demultiplexes wavelengths of the amplified signals and then outputs them to the optical receivers 4 (41, 42, 43, 44, . . . 4N).

Figure 6:
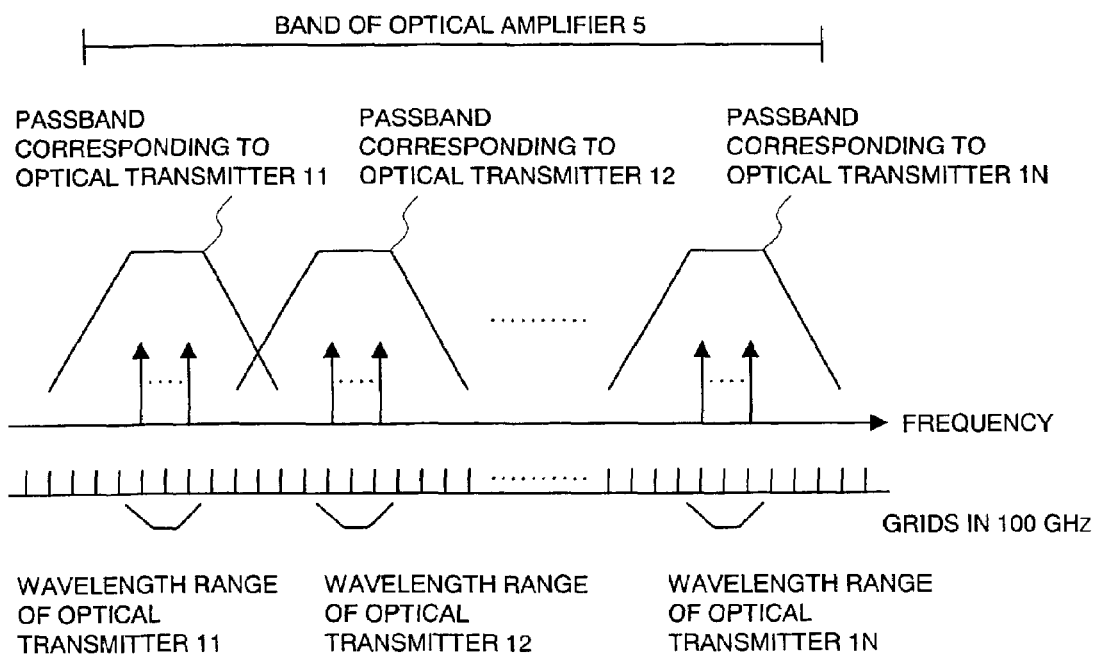
FIG. 6 is an explanatory diagram illustrating a relationship between transmission wavelengths and passbands in the second embodiment of the present invention.

FIG. 6 shows the relationship between transmission wavelengths in the wavelength division-multiplexing optical transmission system and passbands of the wavelength multiplexer 2 and of the wavelength demultiplexer 3.

Likewise the first embodiment, wavelengths output from the optical transmitters 1 (11, 12, 13, 14, . . . 1N), which are marked on the wavelength grid in conformity with the ITU-T Recommendation G.692, as shown in FIG. 6, cover two grids or more including neighboring grids.

In the wavelength multiplexer 2 and the wavelength demultiplexer 3, the passband of each channel passes a wavelength corresponding to the laser wavelength of each of the optical transmitters 1 (11, 12, 13, 14, . . . 1N).

In the operation of the wavelength division-multiplexing optical transmission system with the abovementioned configuration, the optical transmitters 1 (11, 12, 13, 14, . . . 1N) first transmit optical signals each having a predetermined wavelength. The wavelength multiplexer 2 multiplexes the wavelengths of the optical signals and outputs the multiplexed optical signals.

The optical amplifier 5 amplifies optical signals transmitted via an optical fiber and the wavelength demultiplexer 3 demultiplexes the wavelengths of the amplified optical signals. The optical receivers 4 (41, 42, 43, 44, . . . 4N) convert the optical signals of demultiplexed wavelengths into electrical signals.

The second embodiment will be explained in more detail by referring to FIGS. 7 and 8.

Figure 7:
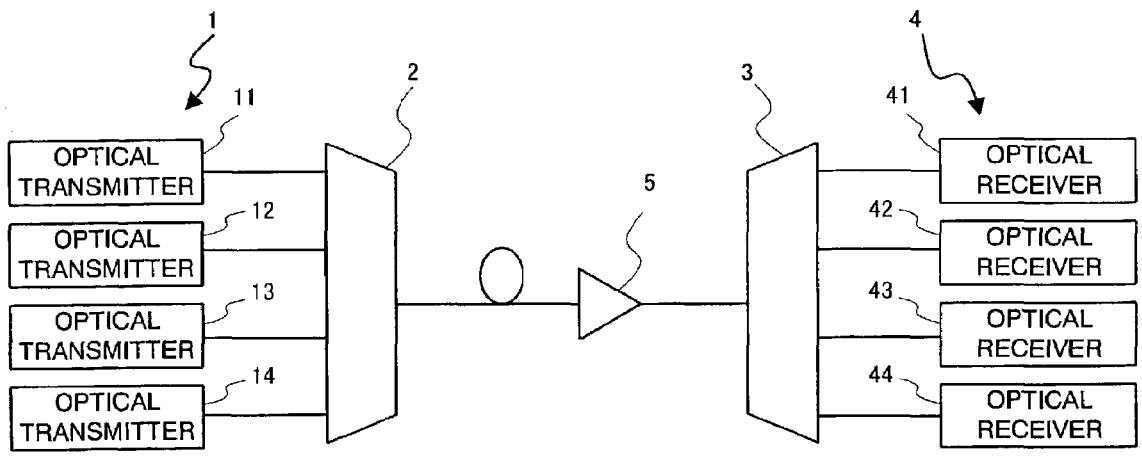
FIG. 7 is a block diagram illustrating a wavelength division-multiplexing system according to the second embodiment of the present invention.

Each of the optical transmitters 11, 12, 13 and 14, shown in FIG. 7, is formed of an optical transmitter having an Electroabsorptive external modulator integrated semiconductor laser beam source. The center wavelength of the optical transmitter 11 is set to 1539.77 nm (194.70 THz). The center wavelength of the optical transmitter 12 is set to 1546.12 nm (193.90 THz). The center wavelength of the optical transmitter 13 is set to 1552.52 nm (193.10 THz). The center wavelength of the optical transmitter 14 is set to 1558.98 nm (192.30 THz). Each of the optical transmitters 11, 12, 13 and 14 transmits an optical signal in such a manner that each wavelength is positioned on the wavelength grid in which laser wavelengths are allocated at 100 GHz intervals. Each wavelength acts as the center wavelength (shown with the arrow upward extending in FIG. 8). Moreover, the wavelength interval between channels is 8 grids (at 800 GHz interval). The band of each channel corresponds to three grids including neighboring grids.

Each of the optical transmitters produces an optical signal with an output power of +2 dBm and at a transmission rate of 10 Gb/s.

The wavelength multiplexer 2 is formed of a thin film interference filter having characteristics including a pass band of 2.5 nm, a loss of 2 dB, and an isolation of 15 dB. The thin film interference filter receives an optical signal input from each of the optical transmitters 11, 12, 13, and 14, multiplexes the wavelength thereof, and then outputs the multiplexed optical signal.

The wavelength multiplexer 2 transmits, to the optical amplifier 5, the optical signal with a single-mode fiber in conformity with the ITU-T Recommendation G.652 or G.655 over a distance of 40 km.

The optical amplifier 5 is formed of an Erbium-doped fiber amplifier (for C-band EDFA) having a gain of 15 dB, a noise figure (NF) of 9 dB, and a band ranging 1530 nm to 1560 nm. The Erbium-doped fiber amplifier amplifies an optical signal input via the transmission path and then outputs the amplified signal.

Likewise the wavelength multiplexer 2, the wavelength demultiplexer 3 is formed of a thin film interference filter having a passband of 2.5 nm, a loss of 2.5 dB and an isolation of 25 dB. The wavelength demultiplexer 3 demultiplexes the wavelength of an optical signal input from the optical amplifier 5 and then outputs optical signals having respective wavelengths.

Each of the optical receivers 41, 42, 43 and 44 has a light receiving sensitivity of −14 dBm. The wavelength demultiplexer 3 converts optical signals, each with a predetermined different wavelength, into electrical signals.

Figure 8:
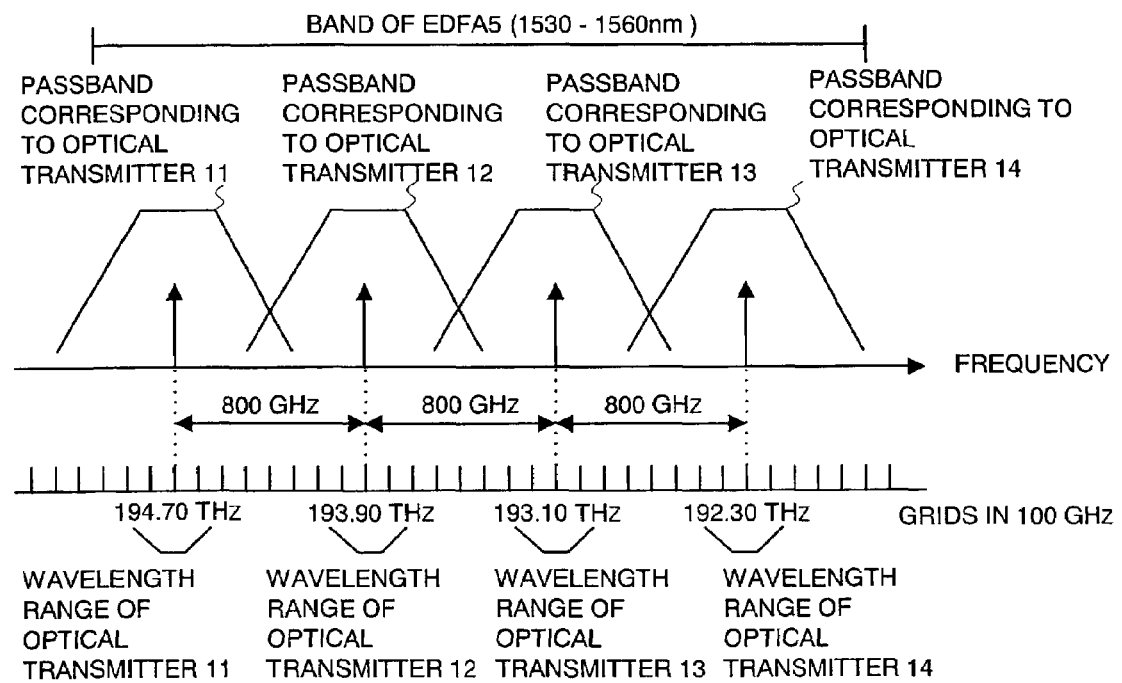
FIG. 8 is an explanatory diagram illustrating a relationship between transmission wavelengths and passbands in the second embodiment of the present invention.

FIG. 8 shows the relationship between transmission wavelengths in the wavelength division-multiplexing optical system in the second embodiment and passbands of wavelength multiplexer 2 and of the wavelength demultiplexer 3.

The laser wavelength of each channel is within the band range of the optical amplifier 5. The wavelengths of respective channels are arranged at regular intervals of 800 GHz. Each passband has about three grids, each corresponding to 100 GHz.

Figure 9:
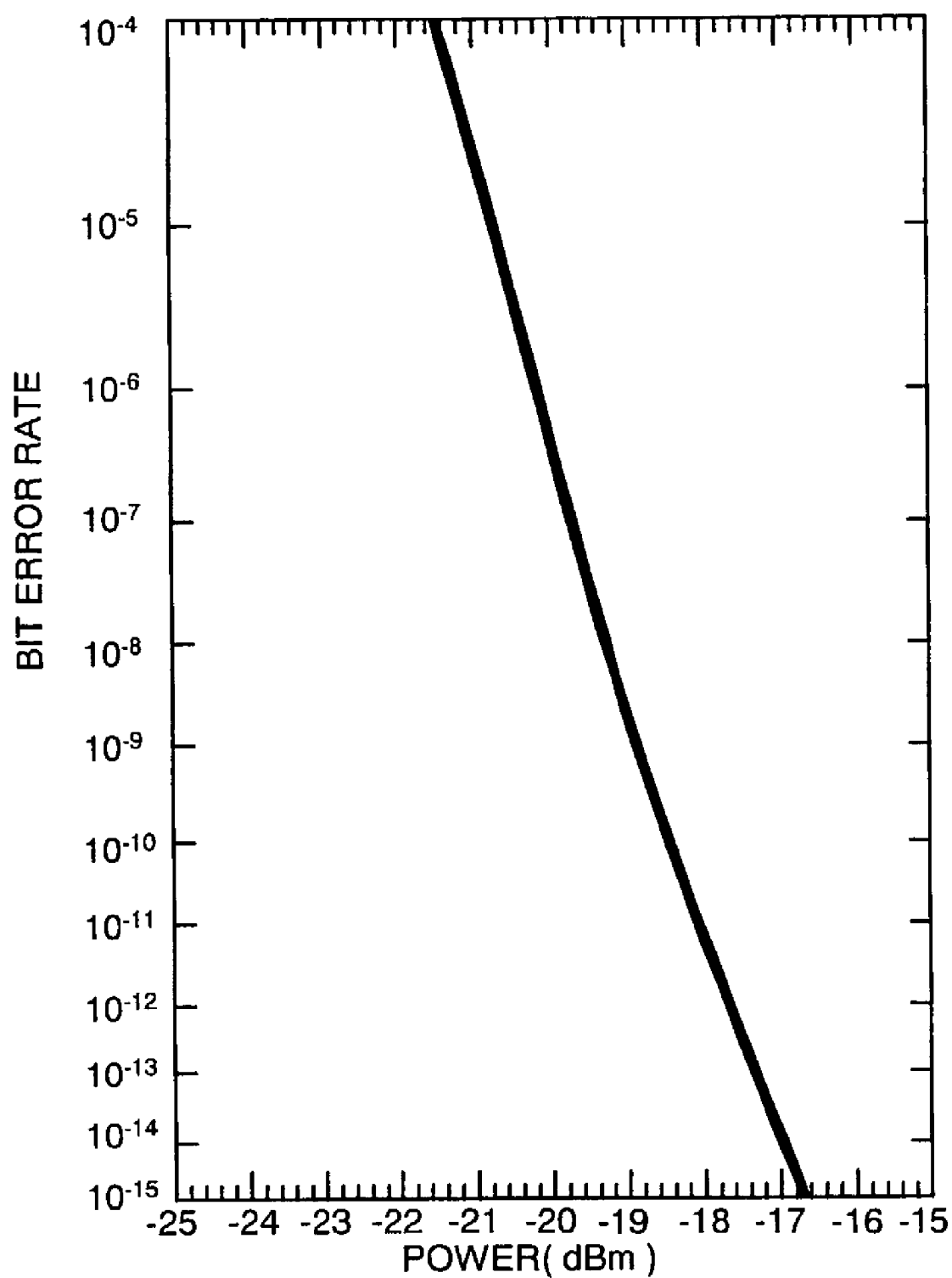
FIG. 9 is a diagram illustrating a bit-error rate characteristic curve in the second embodiment.

FIG. 9 shows an experimental result regarding bit error rate characteristics of a wavelength division-multiplexing optical transmission system in the second embodiment. It is understood that a characteristic with no error floor is obtained, as shown in FIG. 9.

In the second embodiment, the passband is 2.5 nm, the laser wavelength range is set to be a center wavelength +−1.0 nm. In this case, the temperature adjustment range is about +−1° C.

In the conventional requirement, it is required to carry out the temperature adjustment with a precision of about +−0.5° C. or less at intervals of 100 GHz. Hence, the present embodiment can greatly moderate the laser wavelength adjustment requirement, compared with the conventional requirements.

In this embodiment, the number of wavelengths to be multiplexed is 4. However, the number of wavelengths to be multiplexed may be arbitrarily set to be, for example, 2, 3, or 5. Moreover, the wavelength is set to be 1539.77 nm (194.70 THz), 1546.12 nm (193.90 THz), 1552.52 nm (193.10 THz) and 1558.98 nm (192.30 THz). However, wavelengths of other grids may be applied.

The optical amplifier 5 optically amplifies four waves in a lump mode. However, plural optical amplifiers may be respectively used for each wave. The optical amplifier 5 is for the C-band EDFA. However, an optical amplifier for L-band EDFA or a semiconductor optical amplifier may be used as the optical amplifier 5.

The wavelength division-multiplexing optical transmission system according to the third embodiment has substantially the same basic configuration as that in the second embodiment, except that a dispersion shifted single-mode fiber of 40 km, in conformity with ITU-T Recommendations G.653, is used as an optical signal transmission path.

The zero dispersion wavelength is 1549 nm. When an optical signal, with multiplexed wavelengths arranged at regular intervals, is transmitted using the dispersion shifted fiber, it is well known that noises (FWM light), which occur due to the four wave mixing (FWM), deteriorate the signal light transmission characteristics. However, it has been found that such an adverse effect can be reduced through arranging multiplexed wavelengths.

Figure 10:
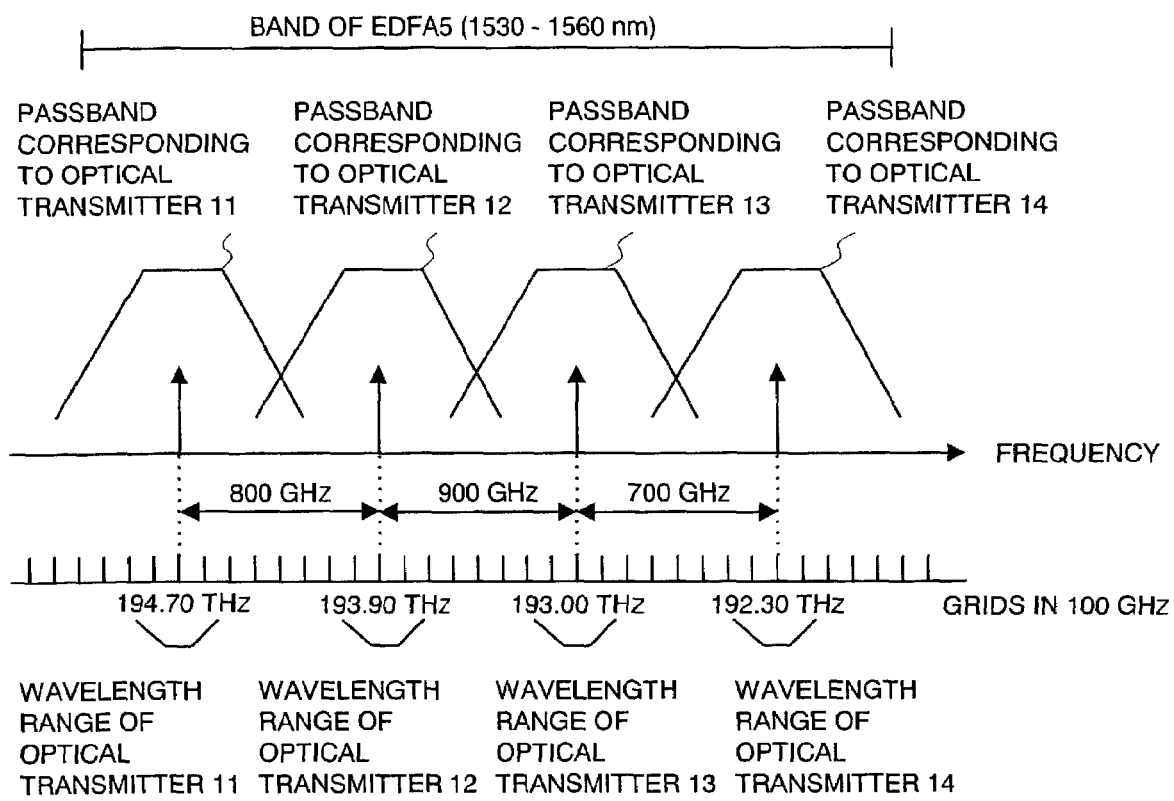
FIG. 10 is an explanatory diagram illustrating a relationship between transmission wavelengths and passbands in a third embodiment of the present invention and FIG. 11 is a diagrammatic view illustrating light levels to wavelength characteristics of a FWM light in the third embodiment.

In the present embodiment, as shown in FIG. 10, the each of the laser wavelength ranges of the optical transmitters 11, 12, 13 and 14 can be set to be broadly cover plural grids, each corresponding to 100 GHz. This allows wavelengths to be arranged at irregular intervals.

That is, laser wavelengths (shown with arrows upward extending in FIG. 10) are arranged at irregular intervals within four passbands positioned at regular intervals on the wavelength grid, on which laser wavelengths are arranged at 100 GHz intervals.

The interval between channels 1 and 2 (on the left side in FIG. 10) is selected to be 800 GHz. The interval between channels 2 and 3 is selected to be 900 GHz. The interval between channels 3 and 4 is selected to be 700 GHz.

Figure 11:
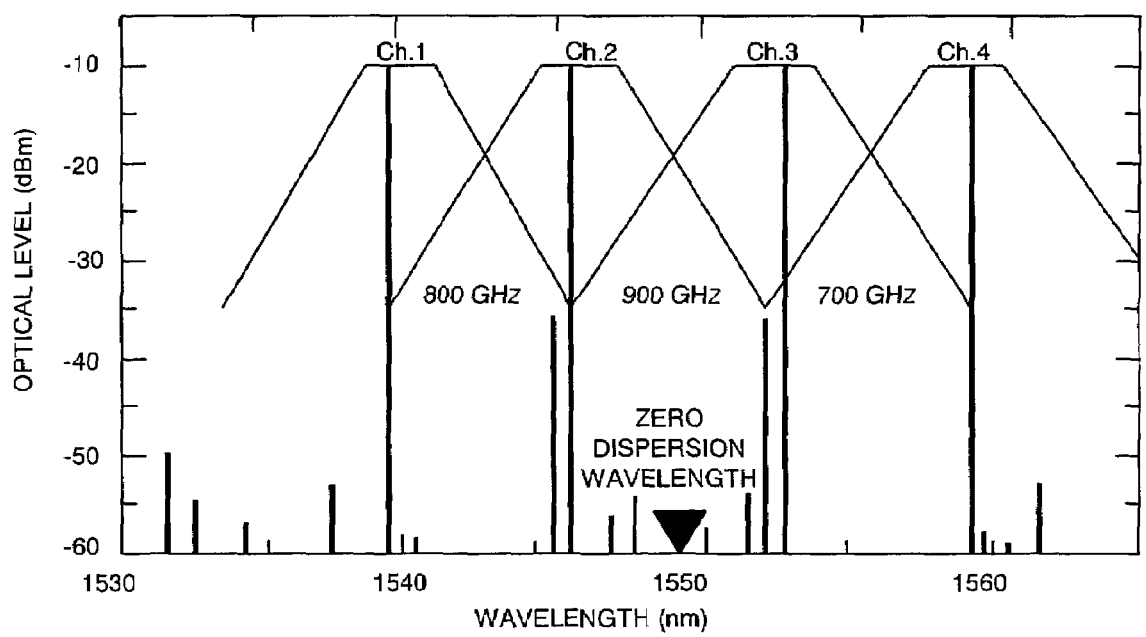

FIG. 11 shows an experimental result showing the relationship between wavelength components and levels of FWM light (noise) traveling a dispersion shifted fiber transmission path of 40 km, with a transmission loss of 0.25 dB/km.

The maximum FWM component is −35 dBm at 1545.32 nm or 1552.52 nm. On the other hand, since the signal light is −10 dBm, the level difference between signal light and FWM light (noise) is approximately 25 dB.

Moreover, the FWM component and the signal light are spaced apart 10 GHz or more and is outside the band of the optical receiver receiving a signal light of 10 Gb/s. Hence, beat noises do not occur.

Only the power penalty of about 0.02 dB merely occurs to affect optical signals in this embodiment. Hence, the levels are negligible on the transmission characteristics.

Because this embodiment has a sufficient broader passband, wavelengths can be selected to have irregular intervals between channels within a laser wavelength allowable range. This allows the influence of FWM to be avoided.

In this embodiment, the number of wavelengths to be multiplexed is 4. However, an arbitrary number, for example, 2, 3, or 5, may be selected. The wavelengths of 1539.77 nm (194.70 THz), 1546.12 nm (193.90 THz), 1553.33 nm (193.00 THz) and 1558.98 nm (192.30 THz) have been used in this embodiment. However, other grid wavelengths may be applicable.

The optical amplifier 5 optically amplifies four waves in a lump mode. However, separate optical amplifiers may be respectively used for each wave. The C-band EDFA has been used as the optical amplifier 5. However, the optical amplifier may be an L-band EDFA or a semiconductor optical amplifier.

The wavelength division-multiplexing optical system with the above-mentioned configuration according to the present invention has the following advantages.

Namely, the improved system can increase the wavelength grid selection range of each optical transmitter and can widen the laser wavelength adjustment range, thus alleviating the laser selection requirement and the wavelength adjustment requirement. These features allow costs of optical transmitters to be reduced. As a result, the cost of the whole system can be largely reduced.

Moreover, the increased wavelength grid selection range of each optical transmitter enables arranging wavelengths at irregular intervals, without changing the passband of the wavelength demultiplexer. The use of a dispersion shifted single-mode fiber enables avoiding the adverse effect caused by four wave mixing, without increasing the costs of the whole system.

The entire disclosure of Japanese Patent Application No. 2001-309873 filed on Oct. 5, 2001 including specification, claims, drawings and summary are incorporated herein by reference in its entirely.

What is claimed is:

1. A wavelength division-multiplexing optical transmission system comprises:

a plurality of optical transmitters for producing optical signals respectively, a wavelength on each of wavelength grids being defined as a center wavelength of each optical signal, said wavelength grids on which laser wavelengths are allocated at grid intervals of 100 GHz, the wavelength interval between respective channels being spaced apart at least two grid intervals, the band of each channel covering at least two grid intervals including neighboring grid intervals;

a wavelength multiplexer for receiving optical signals output from said plurality of optical transmitters, multiplexing wavelengths of said optical signals, and then outputting multiplexed optical signals;

a wavelength demultiplexer for receiving optical signals transmitted output from said wavelength multiplexer, demultiplexing wavelengths of said optical signals, and then outputting optical signals having different wavelengths; and a plurality of optical receivers for converting optical signals, each with a predetermined wavelength range, output from said wavelength demultiplexer, into electrical signals, wherein said wavelength interval between a first optical transmitter and a second optical transmitter is a first number of grids, and said wavelength interval between said first optical transmitter and a third optical transmitter is a second number of grids, the second number being different from the first number and being greater than two.

2. The system defined in claim 1, wherein said wavelength multiplexer has a passband in which optical signals pass within a laser wavelength range of a corresponding channel of an optical transmitter; and wherein said wavelength demultiplexer has a passband in which optical signals pass within a laser wavelength range of a corresponding channel of an optical transmitter.

3. The system defined in claim 1, wherein said wavelength multiplexer multiplexes wavelengths using a thin film interference filter; and wherein said wavelength demultiplexer demultiplexes wavelengths using a thin film interference filter.

4. The system of claim 1, wherein, said wavelength interval between adjacent optical transmitters is eight grids and said band of each channel covers three grids.

5. The system of claim 1, wherein, said first number of grids is at least two greater than said second number of grids so that said second optical transmitter is located at least two grids further from said first optical transmitter and said third optical transmitter is located from said first optical transmitter.

6. The system of claim 1, wherein, said first number of grids is at least one greater than said second number of grids so that said second optical transmitter is located at least one grid further from said first optical transmitter and said third optical transmitter is located from said first optical transmitter.

7. The system of claim 1, wherein, four adjacent optical transmitters are arranged at irregular intervals within four passbands positioned at regular intervals on the wavelength grid, so that the interval between channels 1 and 2 is eight grids, the interval between channels 2 and 3 is nine grids, the interval between channels 3 and 4 is seven grids.

8. The system of claim 1, wherein, said wavelength interval between adjacent optical transmitters is eight grids.

9. The system of claim 1, wherein, said band of each channel covers two grids and bands of adjacent optical transmitters do not overlap.

10. The system of claim 1, wherein, said wavelength interval between adjacent optical transmitters is greater than two grids and said band of adjacent channels do not overlap each other.

11. The system of claim 1, wherein, said band of each channel covers at least two grids and do not overlap any adjacent band.

* * * * *